US008805461B2

(12) United States Patent
Yang et al.

(10) Patent No.: US 8,805,461 B2
(45) Date of Patent: Aug. 12, 2014

(54) PROTECTIVE DEVICE FOR MOBILE DEVICES

(71) Applicant: Beast Kingdom Toys Co., Ltd., New Taipei (TW)

(72) Inventors: Yung-Liang Yang, New Taipei (TW); Shen-Feng Lee, New Taipei (TW)

(73) Assignee: Beast Kingdom Toys Co., Ltd, New Taipei (TW)

( * ) Notice: Subject to any disclaimer, the term of this patent is extended or adjusted under 35 U.S.C. 154(b) by 0 days.

(21) Appl. No.: 13/664,291

(22) Filed: Oct. 30, 2012

(65) Prior Publication Data

US 2013/0252679 A1   Sep. 26, 2013

(30) Foreign Application Priority Data

Mar. 23, 2012   (TW) .............................. 101205287 A

(51) Int. Cl.
*H04W 88/02*   (2009.01)
(52) U.S. Cl.
USPC ..................................... 455/575.8; 455/550.1
(58) Field of Classification Search
CPC ..... H04W 4/10; H04W 88/02; H04M 1/0214; H04M 1/0283

USPC ........................ 455/550.1, 575.7, 90.1, 575.8
See application file for complete search history.

(56) References Cited

U.S. PATENT DOCUMENTS

2012/0273643 A1*   11/2012   Chang ...................... 248/346.06

* cited by examiner

*Primary Examiner* — Sam Bhattacharya
(74) *Attorney, Agent, or Firm* — Haverstock & Owens LLP

(57) ABSTRACT

The present invention discloses a protective device for a mobile device, comprising: a frame comprising a first sidewall, a second sidewall opposite to the first sidewall, a third sidewall and a fourth sidewall opposite to the third sidewall, the sidewalls being terminated with each other and thereby enclosing and defining a space for accommodating the mobile device, each of the first sidewall and the second sidewall being provided with a first engaging feature; and a backboard provided with a second engaging feature corresponding to the first engaging feature; wherein the backboard is formed separately from the frame and is assembled with the frame through the engagement of the first engaging feature and the second engaging feature of the frame. With the present invention, the style of the protective device enclosing the mobile device can be altered by merely replacing its backboard with a new one.

15 Claims, 9 Drawing Sheets

PROTECTIVE DEVICE FOR MOBILE DEVICES

BACKGROUND OF THE INVENTION

1. Field of the Invention

The present invention relates to a protective device for a mobile device, and more particularly, to a protective device with a replaceable backboard for a mobile device.

2. Description of the Prior Art

The mobile phone has been equipped with a variety of new functions and delicately designed housing since it came into existence. Take iPhone as an example, it not only features various functions, such as camera, Personal Digital Assistant, media player, wireless communication, etc., but also supports wireless Internet access, reception and transmission of emails, mobile phone, text messages, Web browsing and wireless communication service. Moreover, the touch screen makes the operation simpler and easier. There have been several generations of iPhone and each of which enjoys great popularity around the world.

The smart phone is more precise than ever, and its delicate housing urges the user to use it with great care so that abrasions will not be formed on the surface of the mobile phone when the mobile phone is stored along with other items nor will the mobile phone be damaged by the impact force acting thereupon due to its fall from a higher place. Therefore, various protective products have been developed for mobile phones. Take a soft protective casing as an example, it is made of silicone gel and has a size substantially the same as that of the mobile phone. Such a soft protective case encloses the mobile phone and has to be removed and reinstalled before and after the replacement of the battery. As the protective casing has a size similar to that of the mobile phone, it will be damaged easily due to excess force exerted thereupon. Moreover, the act of frequent removal and reinstallation will result in elastic fatigue of the protective casing and cause cracks to form on the protective casing. Additionally, although the soft protective casing provides the mobile phone with protection against abrasions, it may not be sufficient to protect the mobile phone from damages caused by higher magnitude forces such as collision or punch.

Alternatively, there is a hard protective casing. The hard protective casing comprises components made of high-cost materials and is configured to solely provide enclosing protection. However, the prior art protective casing, soft or hard, is generally formed integrally and configured to entirely cover and enclose the mobile phone to provide protection while maintaining the user's personal style reflected by the housing. Nowadays, more and more consumers care about whether their personal items look fashionable and unique. As the protective casing is formed integrally, the user has to buy a new protective casing with different design if he/she does not like the original one anymore. This not only increases expenses but also causes inconvenience to the user.

Therefore, a need exists in the art for a protective device for a mobile device which improves the aforementioned prior art drawbacks and allows the user to replace the backboard according to his/her needs.

SUMMARY OF THE INVENTION

In view of the prior art problems described above, an object of the present invention is to provide a protective device for a mobile device so as to solve the problem associated with the structure of the prior art protective casing.

According to one aspect of the present invention, there is provided a protective device for a mobile device, including: a frame constructed by a first sidewall, a second sidewall opposite to the first sidewall, a third sidewall and a fourth sidewall opposite to the third sidewall, and a backboard assembled with the frame. The sidewalls are terminated with each other and thereby encloses defines therewith in a space for accommodating the mobile device. Each of the first sidewall and the second sidewall is provided with a first engaging feature; and the backboard provided with a second engaging feature corresponding to the first engaging feature. The backboard is formed separately from the frame and is assemble with the frame through the engagement of the second engaging feature and the first engaging feature of the frame.

Preferably, the first engaging feature is a track and the second engaging feature is a rail.

Preferably, the first engaging feature is a rail and the second engaging feature is a track.

Preferably, the first engaging feature and the second engaging feature are engagement with each other by an interference fit, a snap fit or a sliding connection.

Preferably, the first engaging feature is formed on an outer side of each of the first sidewall and the second sidewall.

Preferably, the backboard is provided with at least a pair of opposing sidewalls extending perpendicularly at its two sides, and the second engaging feature is formed on each of opposing inner sides of the at least a pair of opposing sidewalls.

Preferably, the first engaging feature is formed on an inner side of each of the first sidewall and the second sidewall.

Preferably, one of the first through fourth sidewalls is provided with a securing feature to further secure the backboard to the frame.

Preferably, the inner side of at least one of the third sidewall and the fourth sidewall is provided with a recess formed thereon, and the backboard is provided with a protrusion corresponding to the recess.

Preferably, the backboard has an even surface.

Preferably, the surface of the backboard is made of a material that is able to be pigmented easily.

Preferably, the backboard has a hole formed thereon to contain and expose at least one supplementary component of the mobile device.

According to a further aspect of the present invention, there is provided another protective device for a mobile device, including: a body constructed by at least a pair of sidewalls through which the body is attached to two opposing sides of a mobile device; and a backboard formed separately from the body. Each of the at least a pair of sidewalls is provided with a first engaging feature and the backboard is provided with a second engaging feature; and the body and the backboard are assembled with each other through the engagement of the first engaging feature and the second engaging feature.

Preferably, the body further includes a connecting member through which the at least a pair of sidewalls are connected with each other.

Preferably, the first engaging feature is a groove and is engaged with the second engaging feature by an interference fit, a snap fit or a sliding connection.

The aforementioned aspects and other aspects of the present invention will be better understood when consideration is given to the following detailed description. Such description makes reference to the appended drawings.

DETAILED DESCRIPTION OF THE PREFERRED EMBODIMENTS

The present invention will be fully described by way of preferred embodiments and appended drawings to facilitate the understanding of the technical features, contents and advantages of the present invention and the effect to be achieved by the present invention. It will be understood that the appended drawings are merely schematic representations and may not be illustrated according to actual scale and precise arrangement of the implemented creation. Therefore, the scope of protection of the present invention shall not be construed based on the scale and arrangement illustrated on the appended drawings and limited thereto.

Figure 1:
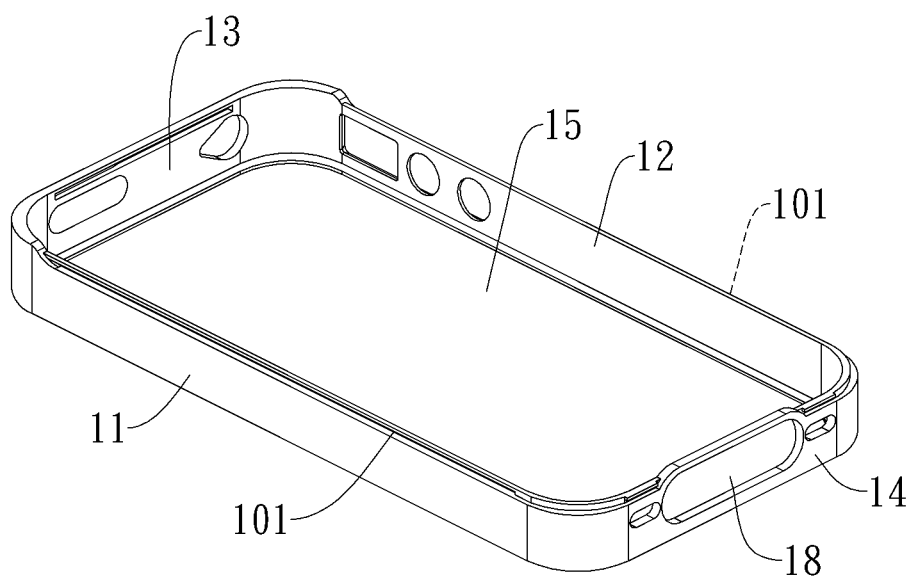
FIG. 1 is a schematic representation illustrating a frame of a protective device in accordance with an embodiment of the present invention.

FIG. 1 is a schematic representation illustrating a frame of a protective device applicable to a mobile device in accordance with an embodiment of the present invention. In this embodiment, the frame 1 is constructed by integrally-formed first through fourth sidewalls 11-14 terminated with each other, and thereby a space 15 is defined and enclosed, as shown in FIG. 1. The space 15 can accommodate a mobile device, e.g. a mobile phone (not shown). Moreover, each of the first sidewall 11 and the second sidewall 12 is further provided with a first engaging feature 101. Under the circumstance that the space 15 accommodates a mobile phone, the sidewalls 11-14 are attached to the sides of the mobile phone so that the frame 1 encloses the outer circumference of the mobile phone.

Figure 2:
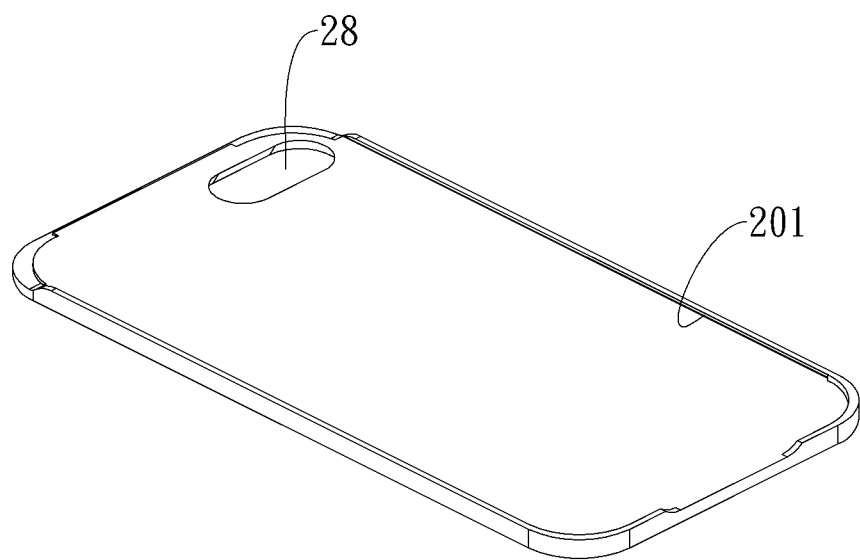
FIG. 2 is a schematic representation illustrating a backboard of a protective device in accordance with an embodiment of the present invention.

FIG. 2 is a schematic representation illustrating a backboard of a protective device in accordance with an embodiment of the present invention. According to the present invention, the backboard 2 is formed separately from the frame 1. As shown in FIG. 2, the main body of the backboard 2 is a flat board and the surface illustrated is the surface (hereafter referred to as "the inner surface") in contact with the back of the mobile device. In this embodiment, the inner surface of the backboard 2 is provided with a second engaging feature 201 corresponding to the first engaging feature 101 of the frame 1.

Figure 3A:
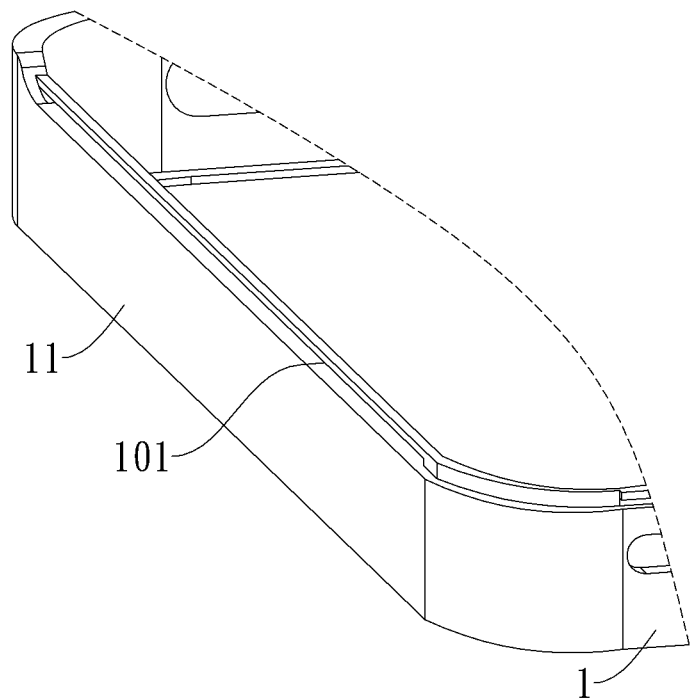
FIG. 3A is an enlarged partial view illustrating a sidewall of the frame of FIG. 1.
Figure 3B:
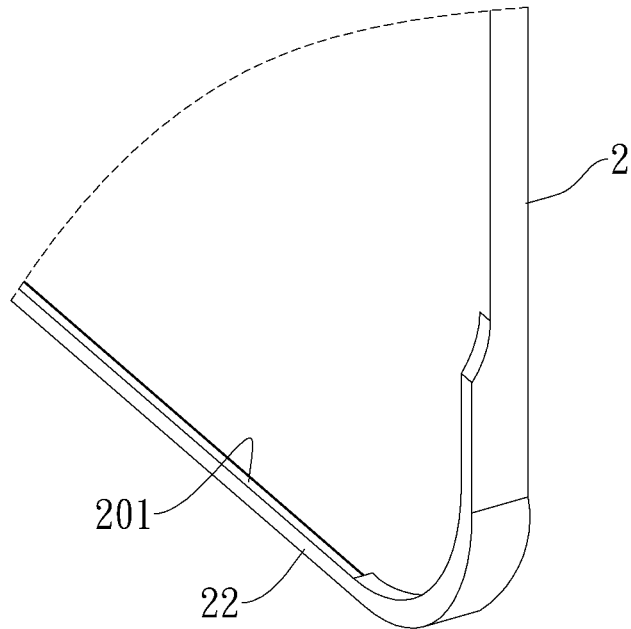
FIG. 3B is an enlarged partial view of the backboard of FIG. 2.

FIG. 3A is an enlarged partial view illustrating a sidewall of the frame 1 of the present invention as shown in FIG. 1; while FIG. 3B is an enlarged partial view of the backboard of a protective device of the present invention which is assembled with the frame 1 shown in FIG. 3A. As shown, the first engaging feature 101 is formed on each of the sides not in contact with the mobile phone (i.e. the "outer sides"), of the first sidewall 11 and the second sidewall (not shown) opposite to the sidewall 11. Preferably, the backboard 2 is provided with at least a pair of opposing sidewalls 22 extending perpendicularly at its two sides, and the second engaging feature 201 is formed on each of opposing inner sides (i.e. the sides close to the mobile phone) of the at least a pair of opposing sidewalls 22. Preferably, the first engaging feature 101 is a track and the second engaging feature 201 is a corresponding rail configured to receive and engage with the track. Alternatively, it is preferable that the first engaging feature 101 is a rail and the second engaging feature 201 is a corresponding track (not shown) to be received by the rail. The present invention is not limited to the aforementioned two arrangements in real practice.

Figure 4:
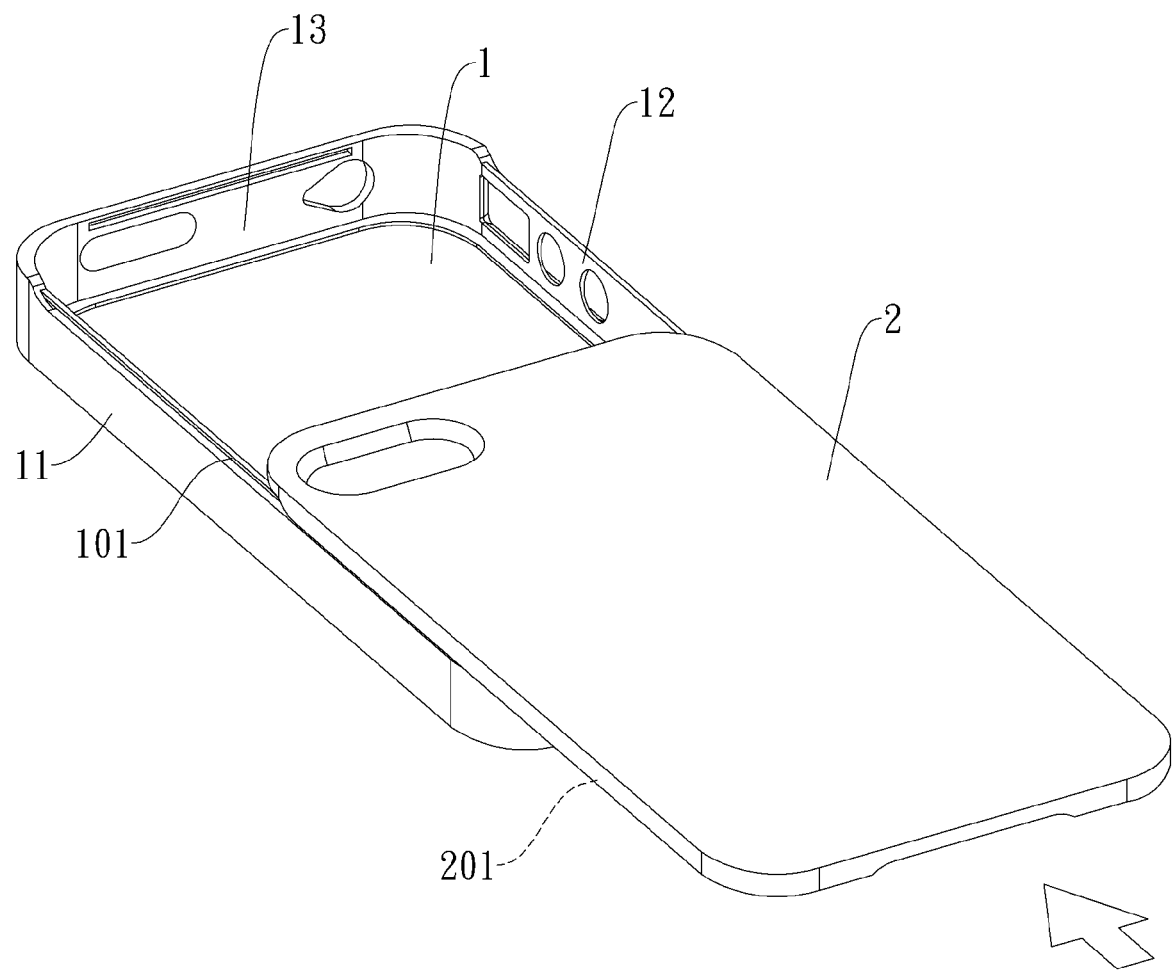
FIG. 4 is a schematic representation illustrating the assembly of the frame in FIG. 3A and the backboard in FIG. 3B.

FIG. 4 is a schematic representation illustrating the assembly of the frame 1 in FIG. 3A and the backboard 2 in FIG. 3B. In this embodiment, the first engaging feature 101 and the second engaging feature 201 can be engaged with each other by an interference fit, a snap fit or a sliding connection, as shown in FIG. 4. Specifically, a force is exerted to the backboard 2 in a direction as indicated by an arrow in FIG. 4 after the second engaging feature 201 of the backboard 2 is engaged with the first engaging feature 101 of the frame 1, such that the backboard 2 is able to slide in a longitudinal direction (i.e. the lengthwise direction) of the sidewall 11 (or sidewall 12) of the frame 1 to a predetermined position so as to effect the assembly of the fame 1 and the backboard 2 through the engagement of the first engaging feature 101 and the second engaging feature 201, thereby forming a protective device or casing for a mobile device.

Figure 5:
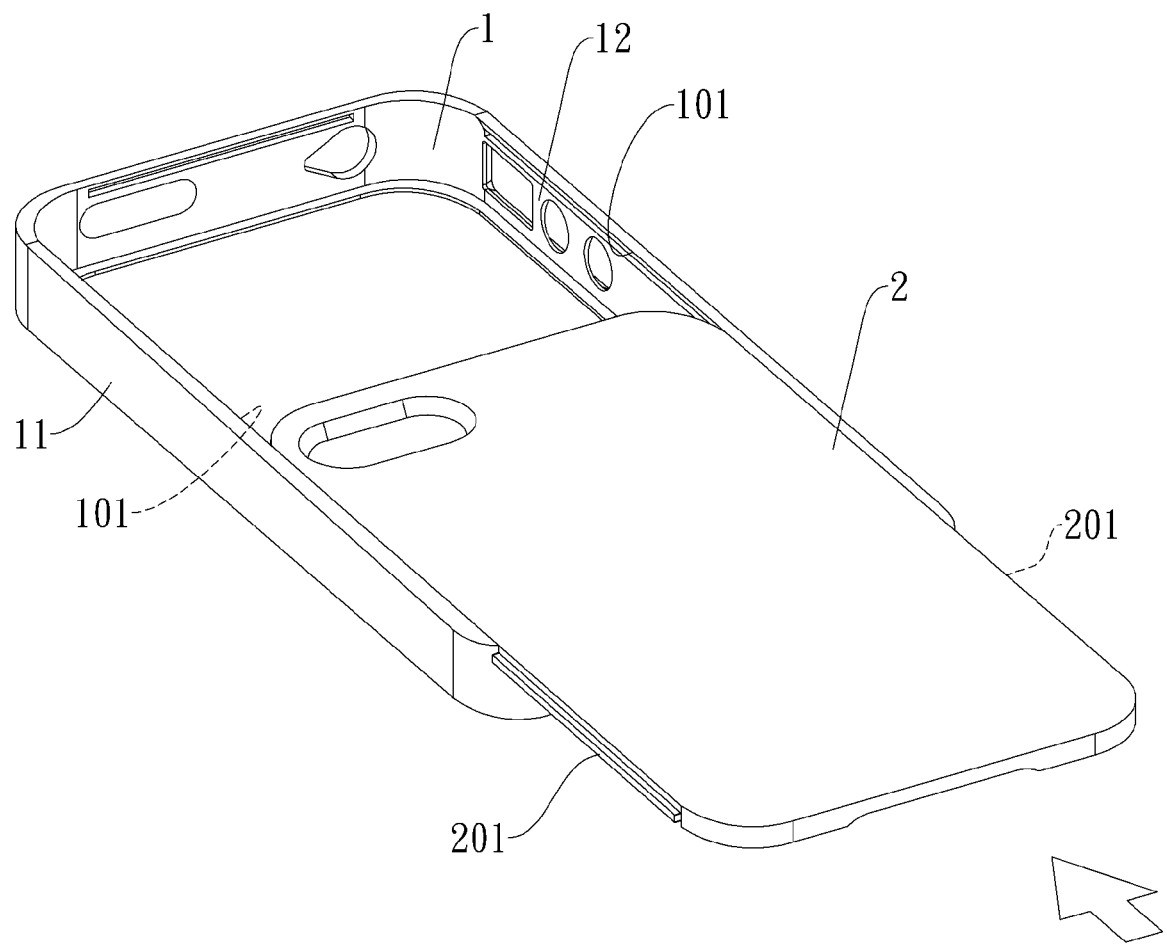
FIG. 5 is a schematic representation illustrating the assembly of a frame and a backboard of a protective device in accordance with another embodiment of the present invention.

FIG. 5 is a schematic representation illustrating the engagement of a frame and a backboard of a protective device in accordance with another embodiment of the present invention. As shown in FIG. 5, it is preferable that the first engaging features 101 are formed respectively on the inner sides (i.e. the sides close to the mobile phone) of the first sidewall 11 and the second sidewall 12 of the frame 1, and the backboard 2 is provided with second engaging features 201 corresponding to the first engaging features 101 of the frame 1. In this embodiment, similar to the embodiment shown in FIG. 4, a force is exerted to the backboard 2 in a direction indicated by an arrow in FIG. 5, and thereby the backboard 2 is slidable in a lengthwise direction of the sidewall 11 (or sidewall 12) of the frame 1 to a predetermined position to effect the assembly of the frame 1 and the backboard 2 through the engagement of the first engaging features 101 and the second engaging features 201, thereby forming a protective device or casing for a mobile device.

A person having ordinarily knowledge in the art will understand that the positions of the aforementioned first engaging features 101 on the sidewalls of the frame 1 and those of the corresponding second engaging features 201 on the backboard 2 are exemplary and are not intended to limit the present invention.

Figure 6A:
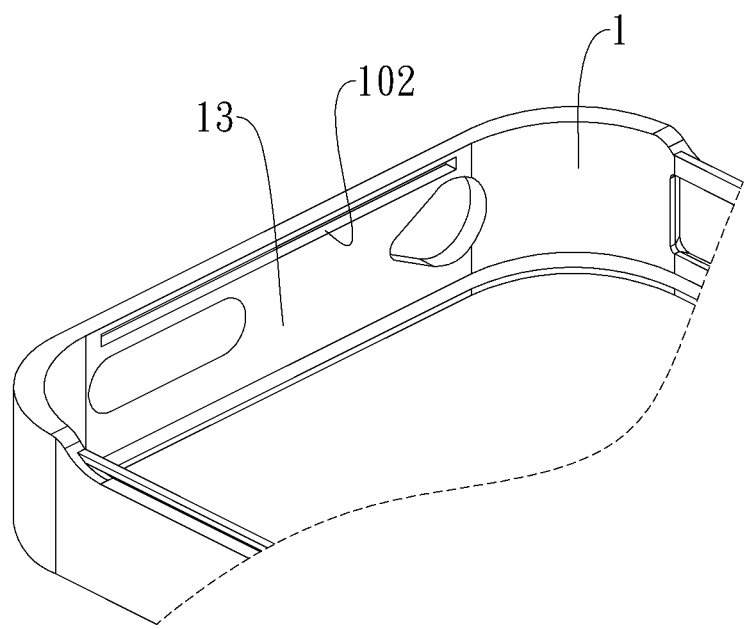
FIG. 6A is a partial view illustrating a sidewall of the frame of a protective device of FIG. 5.
Figure 6B:
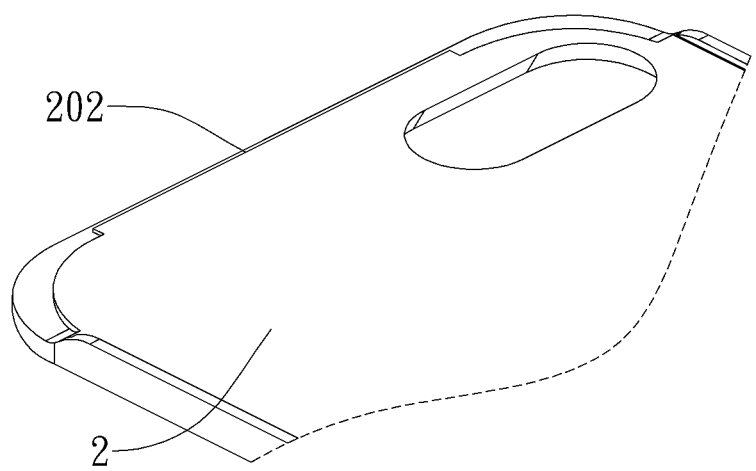
FIG. 6B is a partial view illustrating a side of the backboard of FIG. 5 which is assembled with the frame in FIG. 6A.

FIG. 6A is a partial view illustrating a sidewall of a frame of a protective device in accordance with a further embodiment of the present invention. FIG. 6B is a partial view illustrating a side of a backboard that is able to be engaged with the frame in FIG. 6A. As shown in FIGS. 6A and 6B, the inner side (i.e. the side close to the mobile phone) of at least one of the third sidewall 13 and the fourth sidewall 14 (in this embodiment, the sidewall 13) of the frame 1 may be further provided with a recess 102, and the side of the backboard 2 corresponding to the sidewall 13 may be further provided with a protrusion 202 corresponding to the recess 102. The recess 102 and the protrusion 202 are matched with each other while the frame 1 and the backboard 2 are combined (or assembled) so that the combination between the backboard 2 and the frame 1 may be further reinforced.

Figure 7A:
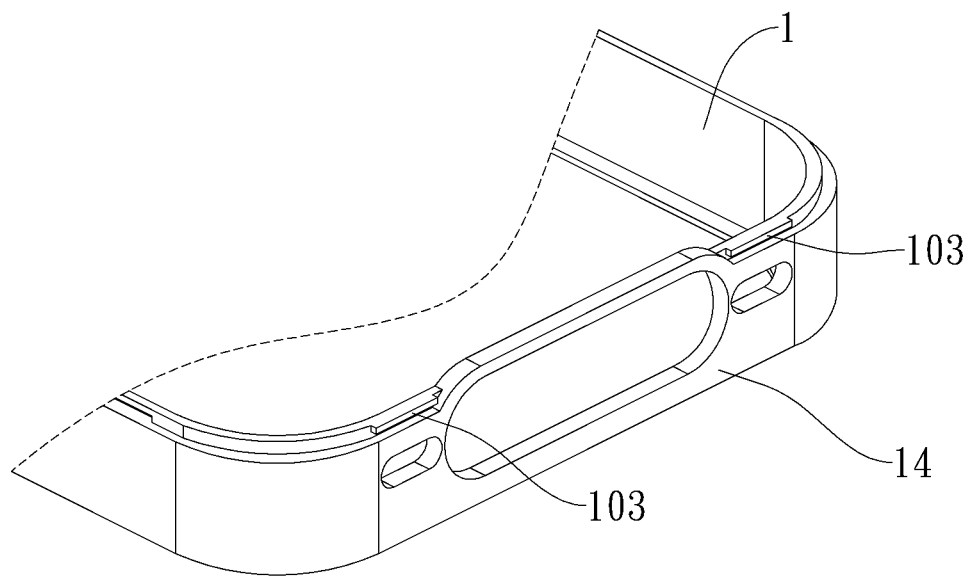
FIG. 7A is a partial view illustrating a sidewall of a frame of a protective device in accordance with a further embodiment of the present invention.
Figure 7B:
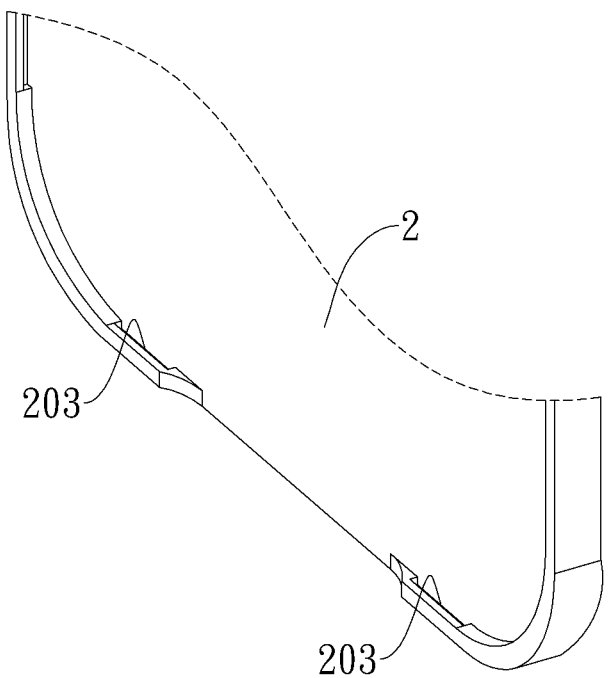
FIG. 7B is a partial view illustrating a side of a backboard assembled with the frame in FIG. 7A.

FIG. 7A is a partial view illustrating a sidewall of a frame of a protective device in accordance with still a further embodiment of the present invention. FIG. 7B is a partial view illustrating a side of a backboard that is able to be engaged with the frame in FIG. 7A. As shown in FIGS. 7A and 7B, the inner side (i.e. the side not in contact with the mobile phone) of at least one of the third sidewall 13 and the fourth sidewall 14 (in this embodiment, the sidewall 14) may be further provided with a protrusion 103, and the side of the backboard 2 corresponding to the sidewall 14 may be further provided with a recess 203 corresponding to the protrusion 103. The protrusion 103 and the recess 203 are matched with each other while the backboard 2 and the frame 1 are combined so that the combination between the backboard 2 and the frame 1 is further reinforced.

The positions and configurations of the protrusion and the recess described in the aforementioned embodiments are exemplary and are not intended to limit the present invention. A person having ordinarily knowledge in the art can easily exchange the relative positions of the protrusion and the recess based on the teachings of the present invention, and such a modification still falls within the scope of the present invention.

Figure 8:
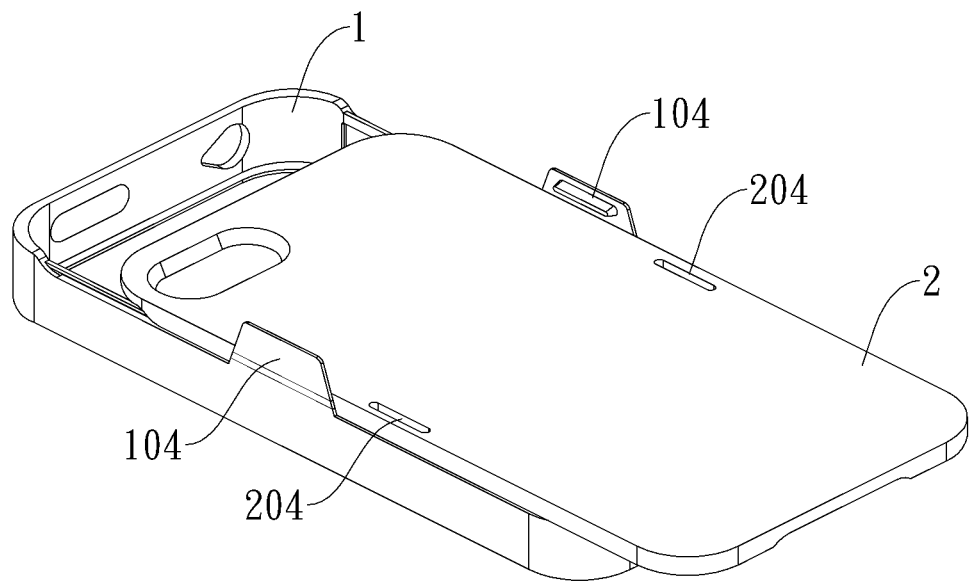
FIG. 8 is a schematic representation illustrating the engagement of the frame of FIG. 7A and the backboard of FIG. 7B.

FIG. 8 is a schematic representation illustrating the engagement of a frame and a backboard in accordance with another embodiment of the present invention. As shown in FIG. 8, each of the first sidewall 11 and the second sidewall 12 of the frame 1 is provided with a securing feature 104, and the recesses 204 corresponding to the securing features 104 are arranged at corresponding positions on the backboard 2. With the combination (such as but not limited to fastening) of the securing features 104 and the recesses 204, the connection between the frame 1 and the backboard 2 can be further reinforced.

Figure 9:
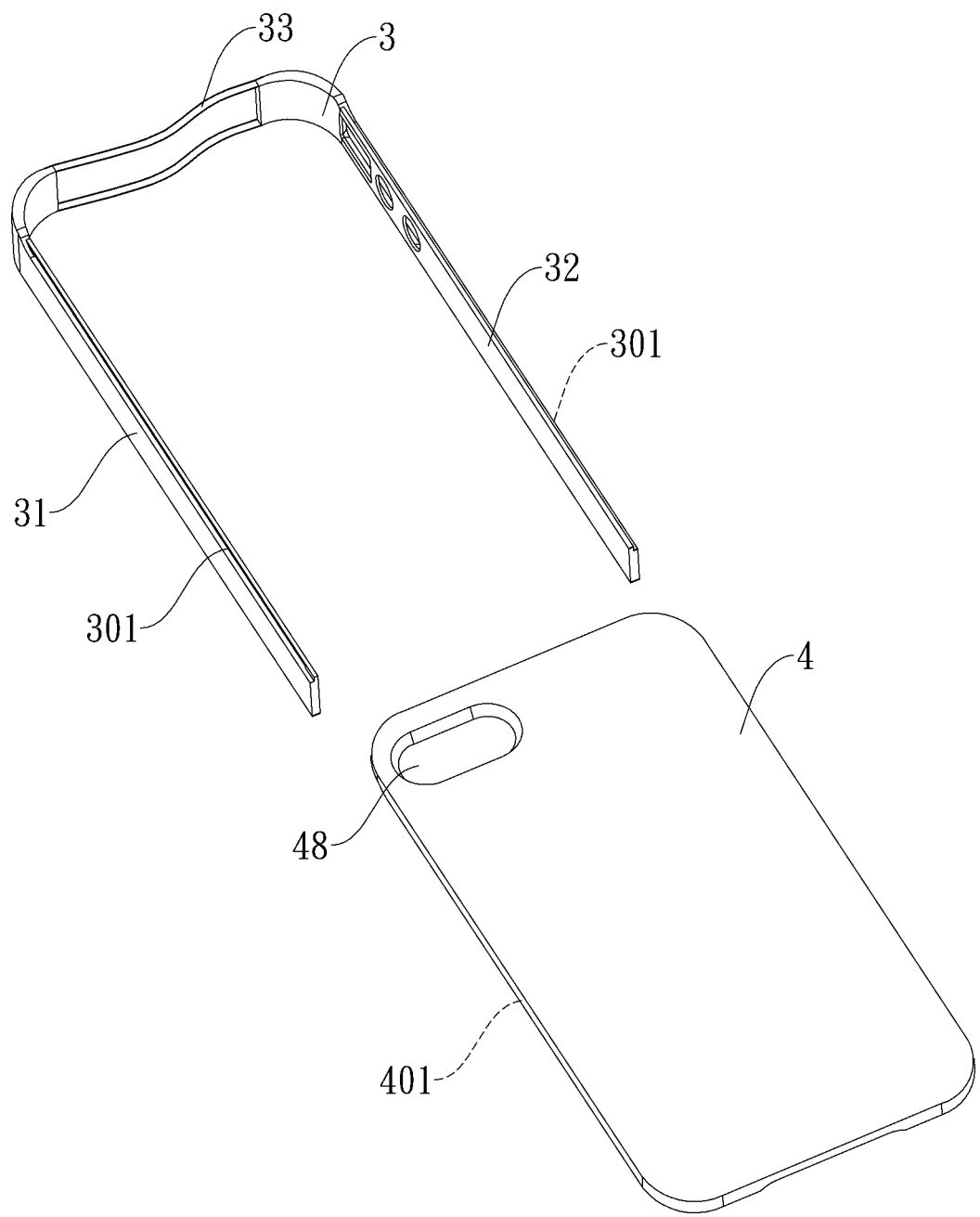
FIG. 9 is a schematic representation of a protective device in accordance with still a further embodiment of the present invention.

FIG. 9 is a schematic representation of a protective device in accordance with still another embodiment of the present invention. In this embodiment, the protective device of the present invention includes a body 3 and a backboard 4 formed separately from the body 3, as shown in FIG. 9. The body 3 is constructed by a pair of sidewalls 31, 32 through which the body 3 are attached to two opposing sides of a mobile device, e.g. a mobile phone (not shown). Each of the pair of sidewalls 31, 32 is further provided with a first engaging feature (e.g. a sliding groove) 301, and the backboard 4 is further provided with a second engaging feature 401 corresponding to the sliding groove 301.

The configurations of the sliding groove 301 on the pair of sidewalls 31, 32 and the engaging features 401 on the backboard 4 and the manner in which the sliding groove 301 and the engaging feature 401 are engaged are similar to those described above, thus no further description will be provided. However, it is worth mentioning that the body 3 is further provided with a connecting member 33 for connecting the sidewalls 31 and 32. The connecting member 33 can be made of any material with extensibility, such as transparent rubber, in real practice. The sidewalls 31, 32 are connected with each other through the connecting member 33 and thus cover the corresponding sides of the mobile phone. The sliding groove 301 and the engaging feature 401 is engaged with each other preferably by the interference fit, snap fit or sliding connection. That is, the body 3 and the backboard 4 are assembled through the engagement of the sliding groove 301 and the second engaging feature 401, so as to form a protective device or casing for a mobile device.

When a protective device for a mobile device of the present invention is implemented in real practice, it is preferable that the backboard 2 (or the backboard 4) has an even surface and that the surface is made of a material which is pigmented easily, so that the different figures or patterns can be favorably formed on the backboard 2. Optionally, at least one hole or opening (e.g. holes or openings 18, 28, 48) are defined on the frame 1 (or the body 3) and the backboard 2 (or the backboard 4) to contain and expose at least one supplementary component (e.g. a transmission port, a photographing lens, etc.) of the accommodated mobile device. While it is preferable that the frame 1 (or the body 3) and the backboard 2 (or the backboard 4) are made of a soft material or a hard material, applicable materials are not limited to the aforementioned materials in real practice.

A person having ordinarily knowledge in the art will understand that the configurations of the frame, backboard and fixing body of the protective device of the present invention and the embodiments of the first engaging feature, second engaging feature, securing feature, etc. are exemplary and are not intended to limit the present invention. Any device made without departing from the spirit and scope of the protective device for a mobile device of the present invention falls within the scope of the present invention.

To sum up, the protective device for a mobile device of the present invention enables the user to replace the backboard of the protective casing according to his/her needs/preferences.

The embodiments depicted above are exemplary and are not intended to limit the scope of the present invention. Any change or alteration with equivalent efficiency made without departing from the spirit and scope of this creation falls within the scope of the appended claims.

What is claimed is:

1. A protective device for a mobile device, comprising:
   a frame comprising a first sidewall, a second sidewall opposite to the first sidewall, a third sidewall and a fourth sidewall opposite to the third sidewall, the sidewalls being terminated with each other and thereby enclosing and defining a space for accommodating the mobile device therein, each of the first sidewall and the second sidewall being provided with a first engaging feature; and
   a backboard provided with a second engaging feature corresponding to the first engaging feature;
   wherein the backboard is formed separately from the frame and is assembled with the frame through the engagement of the first engaging feature and the second engaging feature.

2. The protective device according to claim 1, wherein the first engaging feature is a track and the second engaging feature is a rail.

3. The protective device according to claim 1, wherein the first engaging feature is a rail and the second engaging feature is a track.

4. The protective device according to claim 1, wherein the first engaging feature and the second engaging feature are engaged with each other by one of an interference fit, a snap fit and a sliding connection.

5. The protective device according to claim 1, wherein the first engaging feature is formed on an outer side of each of the first sidewall and the second sidewall.

6. The protective device according to claim 5, wherein the backboard is provided with at least a pair of opposing sidewalls extending perpendicularly at the sides thereof and the second engaging feature is formed on each of opposing inner sides of the at least a pair of opposing sidewalls.

7. The protective device according to claim 1, wherein the first engaging feature is formed on an inner side of each of the first sidewall and the second sidewall.

8. The protective device according to claim 1, wherein one of the sidewalls is provided with a securing feature to further secure the backboard to the frame.

9. The protective device according to claim 1, wherein an inner side of at least one of the third sidewall and the fourth sidewall has a recess formed thereon, and the backboard is provided with a protrusion corresponding to the recess.

10. The protective device according to claim 1, wherein the backboard has an even surface.

11. The protective device according to claim 1, wherein the backboard is made of a material that is able to be pigmented easily.

12. The protective device according to claim 1, wherein the backboard has an hole defined thereon for containing and exposing at least one supplementary component of the mobile device.

13. A protective device for a mobile device, comprising:
a body comprising at least a pair of sidewalls through which the body is attached to two opposing sides of a mobile device; and
a backboard formed separately from the body;
wherein each of the at least a pair of sidewalls is provided with a first engaging feature and the backboard is provided with a second engaging feature; and wherein the body and the backboard are combined through the engagement of the first engaging feature and the second engaging feature.

14. The protective device according to claim 13, wherein the body further comprises a connecting member through which the at least a pair of sidewalls are connected with each other.

15. The protective device according to claim 13, wherein the first engaging feature and the second engaging feature are engaged with each other by one of an interference fit, a snap fit or a sliding connection.

* * * * *